US006619818B2

(12) United States Patent
Grove

(10) Patent No.: US 6,619,818 B2
(45) Date of Patent: Sep. 16, 2003

(54) LIGHT BULB HOUSING ASSEMBLY

(76) Inventor: James E. Grove, 4316 Marina City Dr., #423CTN, Marina del Rey, CA (US) 90292

( * ) Notice: Subject to any disclaimer, the term of this patent is extended or adjusted under 35 U.S.C. 154(b) by 393 days.

(21) Appl. No.: 09/729,364

(22) Filed: Dec. 5, 2000

(65) Prior Publication Data

US 2002/0067613 A1 Jun. 6, 2002

(51) Int. Cl.$^7$ ................................................ F21L 15/04
(52) U.S. Cl. ...................... 362/267; 362/474; 362/369; 362/475; 362/455; 362/311
(58) Field of Search ................. 362/267, 455, 362/311, 310, 548, 549, 544, 474, 475, 369

(56) References Cited

U.S. PATENT DOCUMENTS 6,039,461 A * 3/2000 Cummings et al. ......... 362/287
6,491,407 B1 * 12/2002 Beadle ....................... 362/153

* cited by examiner

*Primary Examiner*—Thomas M. Sember
*Assistant Examiner*—Anabel Ton
(74) *Attorney, Agent, or Firm*—Jack C. Munro

(57) ABSTRACT

A light bulb housing, method of making same and method of replacing a light bulb within the light bulb housing wherein the housing has an internal chamber which is almost completely closed except for a single access opening. A light bulb is mounted within the internal chamber. A biasing device, such as a coil spring, is mounted within the internal chamber and located between the light bulb and the access opening. A lens is then mounted within the internal chamber against the coil spring and while compressing of the biasing device a O-ring seal is installed within a groove formed in the sidewall of the access opening. Upon manual release of the lens, the coil spring forces the lens into watertight, airtight, dustproof engagement with the O-ring seal.

9 Claims, 2 Drawing Sheets

LIGHT BULB HOUSING ASSEMBLY

BACKGROUND OF THE INVENTION

1) Field of the Invention

The field of this invention relates to a light bulb housing assembly and more particularly to a light bulb housing assembly designed in particular to be used in conjunction with a motor vehicle, such as a motorcycle.

2) Description of the Prior Art

Light bulb housing assemblies have long been known and are commonly used on motor vehicles, such as motorcycles. The light bulb housing assembly can be utilized to contain a turn signal light bulb, running light bulb or brake light bulb that are to be activated in conjunction with operation of the motorcycle. Previously, such light bulb housings have been designed to be rather complex in construction and therefore constructed of many parts which are assembled together. It is also important that such light bulb housings be waterproof as the light bulb housings are going to be subjected to exterior weather conditions which include water, mud and dust. It is also important that the light bulb housings have a pleasing appearance. Additionally, it is also important that the light bulb housing be able to be constructed at a minimal cost as expensive such housings are commonly not utilized because of excessive cost. Further, it is another requirement that such housings are capable of being sold as an after market product and are capable of being installed by individuals of minimal skill.

SUMMARY OF THE INVENTION

A light bulb housing assembly of the present invention is designed to achieve the above noted objectives. The housing assembly includes a housing which is commonly fabricated of a solid piece of metal or plastic which has an internal chamber with an access opening. The access opening has a sidewall, and within that sidewall is formed an annular groove. A light bulb is to be mounted within the internal chamber. Mounted within the internal chamber between the light bulb and the access opening is a biasing device such as a coil spring. Also mounted within the internal chamber is a lens with the coil spring to abut against the lens. An O-ring seal is to be located in conjunction with the annular groove. The biasing device exerts a constant bias against the lens forcing such into contact with the O-ring seal forming a watertight, airtight and dustproof connection.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE PREFERRED EMBODIMENT

Figure 1:
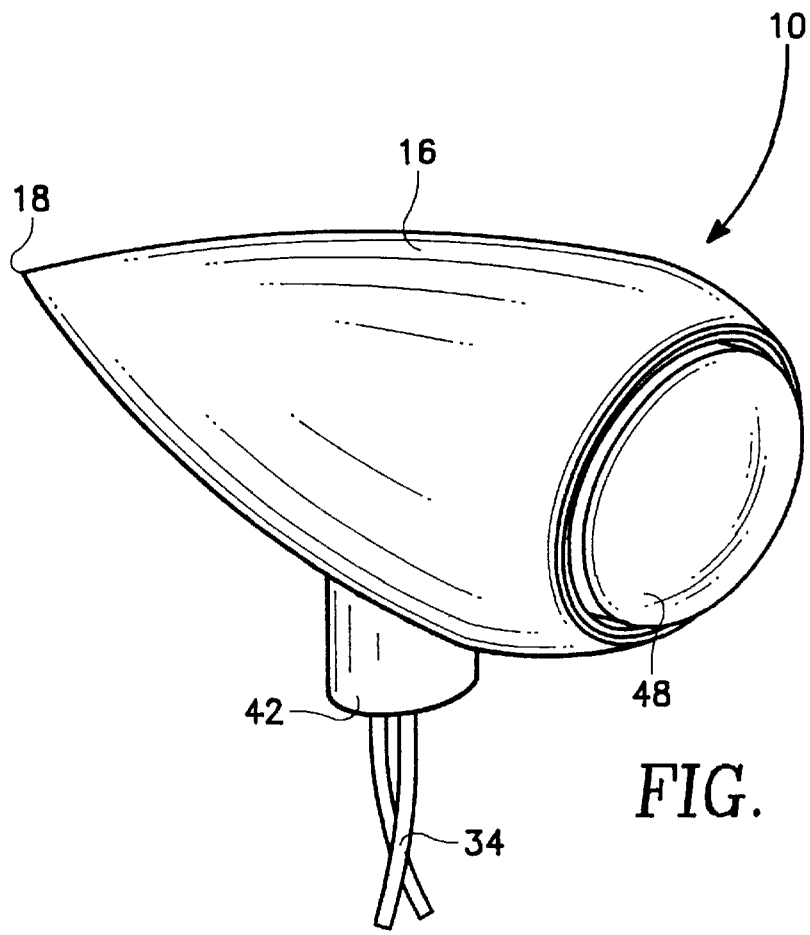
FIG. 1 is an exterior frontal isometric view of the light bulb housing assembly of the present invention.

Referring particularly to the drawings, there is shown a light bulb housing assembly 10 of this invention. The light bulb housing assembly 10 utilizes a housing 12 which has an internal chamber 14. The housing 12 is to be formed from a single block of material with generally a metallic material being preferred. However, it is considered to be within the scope of this invention that the housing 12 could be formed of a plastic material. The external surface 16 of the housing 12 is basically cone-shaped with the aft end of the housing 12 coming to a point 18. The front end of the housing 12 includes a cylindrical access opening 20 which provides access into the enlarged portion 26 of the internal chamber 14. Formed within the sidewall of the access opening 20 is an annular groove 22. The annular groove 22 is to accommodate a seal in the form of an O-ring 24. The O-ring 24 is to be located in a tight fitting manner in conjunction with the groove 22.

The access opening 20 connects with a cylindrically shaped enlarged portion 26 of the internal chamber 14. The rear portion of the internal chamber 14 is substantially smaller in diameter, and connecting between the rear portion of the internal chamber 14 and the enlarged portion 26 is an annular cone-shaped flange 28. Mounted within the rear portion of the internal chamber 14 is the base 30 of a light bulb 32. Connecting with the base 30 are a pair of wires 34. These wires 34 are conducted through a pair of holes 36 formed within the housing 12. Located alongside the holes 36 is a threaded hole 38. The threaded hole 38 and the holes 36 connects with enlarged circular recess 40 formed within the housing 12.

To be mounted within the recess 40 in a close conforming manner is a short sleeve 42. The short sleeve 42 has a through opening 44. The wires 34 are to be conducted through the through opening 44 with the short sleeve 42 being mounted in a close conforming manner within the recess 40. With the short sleeve 42 mounted in conjunction with the recess 40, a threaded fastener (not shown) is to be conducted through the through opening 44 to engage with the threaded hole 38 to thereby securely mounting the light bulb housing 10 onto an exterior structure, such as a fender of a motorcycle (which is not shown).

Located within the enlarged portion 26 of the internal chamber 14 is a biasing device, such as a coil spring 46. Also to be located within the enlarged portion 26 of the internal chamber 14 is a disc-shaped lens 48. This disc-shaped lens 48 has an annular ridge 50. The aft end of the coil spring 46 abuts against an annular ledge 52.

Figure 2:
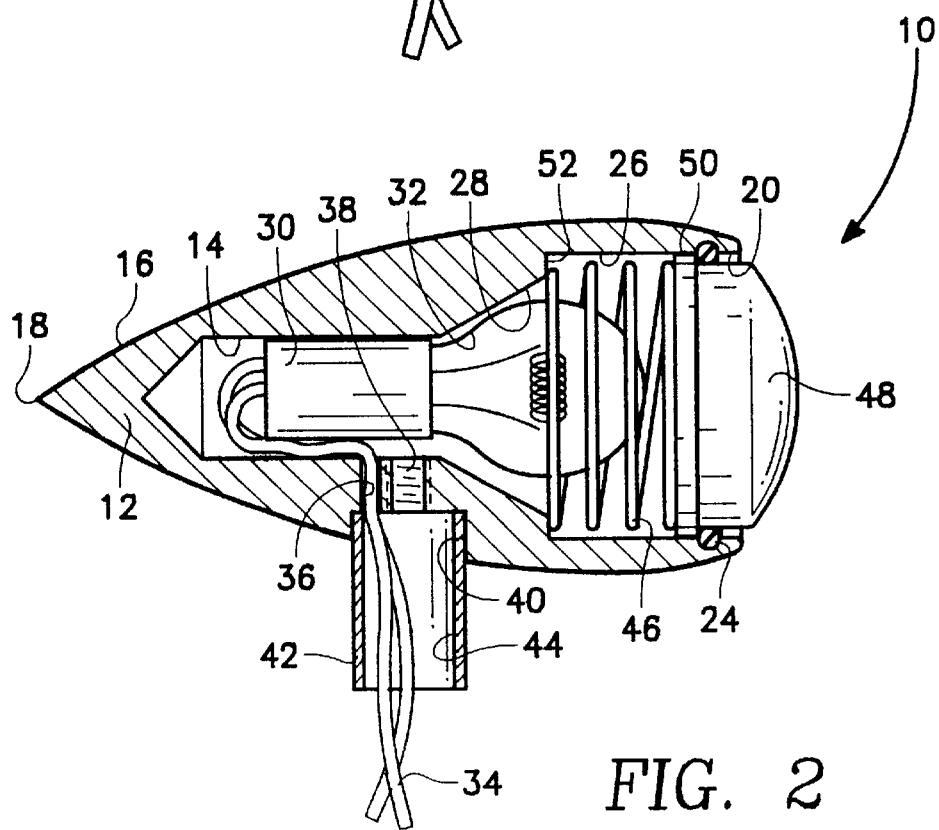
FIG. 2 is a longitudinally transverse cross-sectional view through the light bulb housing assembly of FIG. 1 showing the light bulb housing in its completely assembled and normal usage state.

When the parts that make up this light bulb assembly 10 are in the position shown in FIG. 2, the annular ridge 50 abuts against the O-ring 24 forming a watertight, airtight and dustproof seal therebetween. The lens 48 will normally be constructed of a translucent or transparent material such as plastic or glass. When in the position of FIG. 2, the coil spring 46 exerts a bias between the annular ledge 52 and the lens 48 functioning to maintain the connection between the lens 48 and the O-ring 24. The light bulb 32 will be actually partially located within the confines of the coil spring 46. The normal usage position of the light bulb housing assembly is as it appears in FIGS. 1 and 2.

Figure 3:
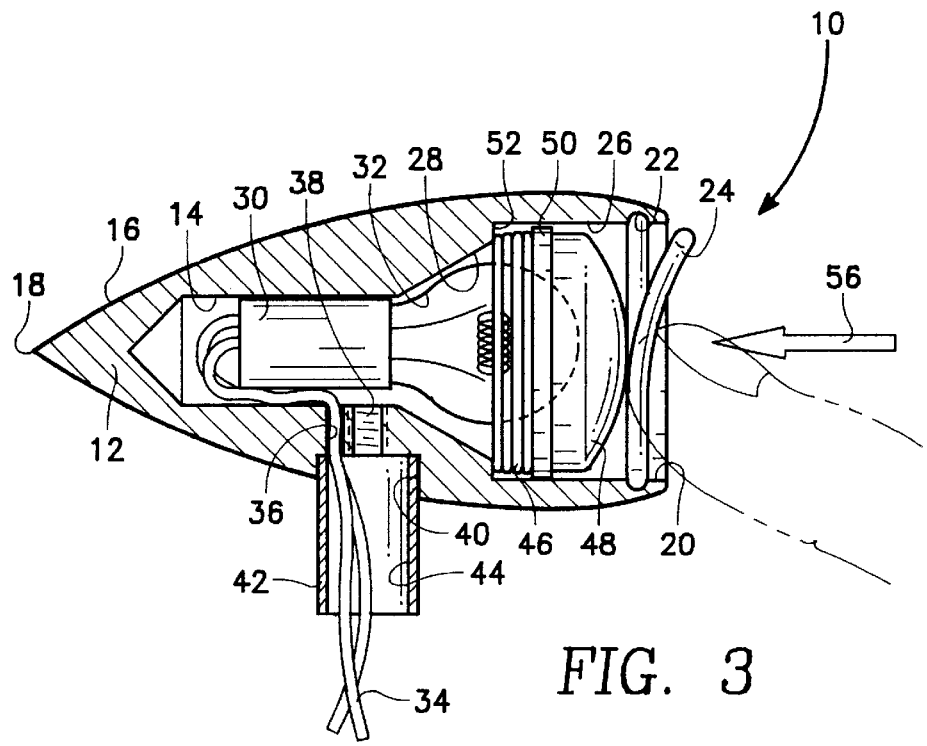
FIG. 3 is a cross-sectional view similar to FIG. 2 but depicting movement of the lens in conjunction with the light bulb housing assembly and disengagement of a seal.
Figure 4:
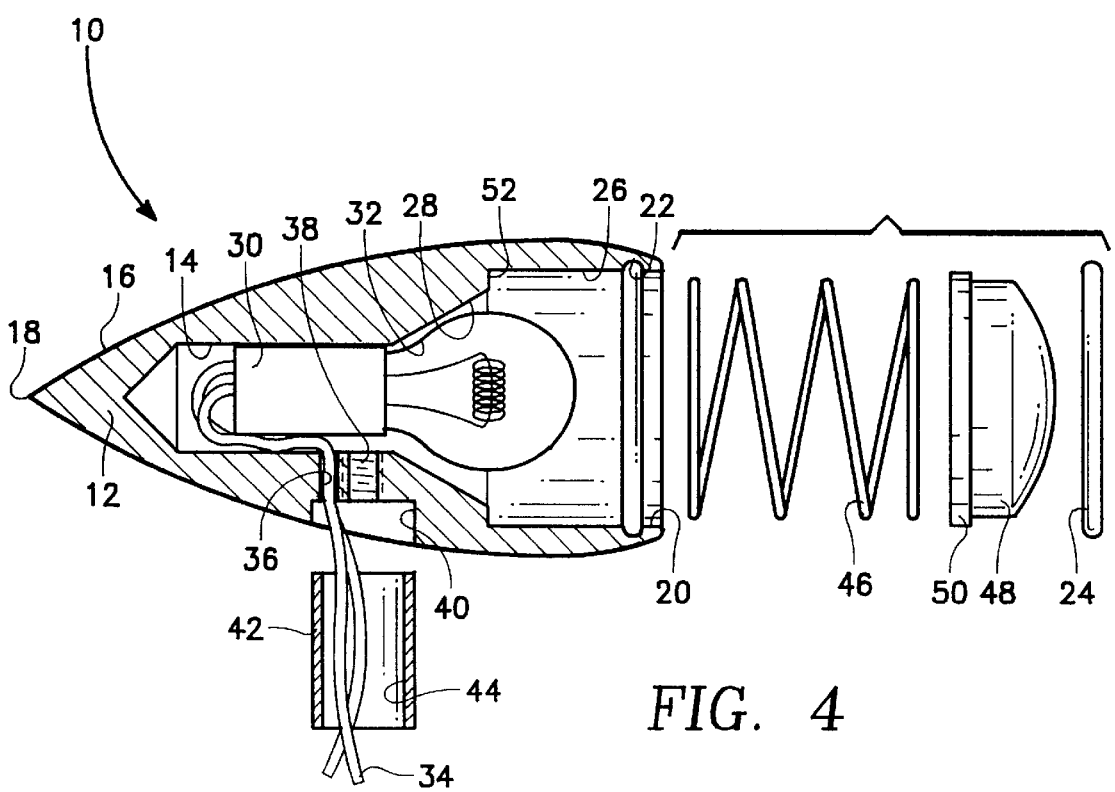
FIG. 4 is an exploded cross-sectional view showing the lens, seal, and coil spring incorporated in conjunction with the light bulb housing assembly of this invention being dislodged from the housing.

If it becomes necessary to replace the light bulb 32, the user needs to apply a force with one of the user's fingers 54 in the direction of arrow 56 causing the lens 48 to be moved within the enlarged portion 26 of the internal chamber 14 compressing of the spring 46 with this position being clearly shown in FIG. 3 of the drawings. When in this position, the user is capable of disengaging the O-ring 24 from the annular groove 22 and remove such from the enlarged portion 26. This will now permit the lens 48 to be completely separated from the enlarged portion 26 along with the spring 46. Access to the light bulb 32 is now permitted.

Upon replacement of the light bulb 32, the user will then reinsert the coil spring 46 within the enlarged portion 26 and then insert the lens 48 also within the enlarged portion 26 abutting against the coil spring 46. The lens 48 is to be pushed inward to the position substantially shown in FIG. 3 compressing the coil spring 46. In that position, the user is now capable of replacing the O-ring 24 in conjunction with the annular groove 22. Upon the manual force represented by arrow 56, now being released from the lens 48, the lens 48 will be biased by the coil spring 46 in an outward direction until the ridge 50 will abut tightly against the O-ring 24 forming the watertight, airtight and dustproof connection.

The present invention may be embodied in other specific forms without departing from the essential attributes thereof. Reference should be made to the appending claims rather than the foregoing specification as indicating the scope of the invention.

What is claimed is:

1. A light bulb housing assembly comprising:

a housing having an internal chamber;

a light bulb mounted within said internal chamber;

an access opening formed within said housing, said access opening providing access to said internal chamber;

sealing means mounted within said access opening and mounted within said housing, said sealing means forming a watertight, airtight, dustproof connection with said housing, said sealing means being manually removable;

a lens mounted within said internal chamber, said lens to be located in contact with said sealing means in its normal usage position, said lens being capable of being moved further into said internal chamber away from said sealing means which will permit said sealing means to be removed from said housing which then permits said lens to be removed from said internal chamber by passing through said access opening in order to gain access to said light bulb for replacement; and biasing means located within said internal chamber, said biasing means being in contact with said lens exerting a biasing force normally pressing said lens against said sealing means.

2. The light bulb housing assembly as defined in claim 1 wherein:

said access opening being cylindrical.

3. The light bulb housing assembly as defined in claim 2 wherein:

said sealing means comprising an O-ring.

4. The light bulb housing assembly as defined in claim 3 wherein:

said lens being disc shaped.

5. The light bulb housing assembly as defined in claim 1 wherein:

said biasing means comprising a coil spring.

6. A method of replacing a light bulb located within an internal chamber contained within a light bulb housing comprising the steps of:

displacing a lens from its at rest position with said housing by moving said lens further into said internal chamber;

removing a seal assembly located within said internal chamber and mounted on said housing;

causing said lens to be removed from said internal chamber which is now permitted by said seal assembly being dislodged exposing of said light bulb permitting removal and replacement of said light bulb;

replacing of said lens within said internal chamber;

replacing of said seal assembly within said internal chamber; and permitting said lens to abut against said seal assembly forming a watertight, airtight, dustproof seal.

7. The method as defined in claim 6 wherein the step of displacing comprises moving of said lens against the action of a spring bias.

8. The method as defined in claim 6 wherein the step of causing utilizes the force of the spring bias to remove said lens from said internal chamber.

9. A method of making a light bulb housing comprising the steps of:

forming an internal chamber within said housing which has a cylindrical access opening which has a sidewall that connects with said internal chamber;

forming an annular groove within said sidewall;

mounting of a light bulb within said internal chamber;

inserting of a biasing means within said internal chamber and locate such biasing means between said light bulb and said access opening;

inserting of a lens into said internal chamber with said lens abutting said biasing means and maintaining of said lens spaced from said annular groove and said biasing means compressed;

locating a seal within said annular groove; and releasing of said lens permitting of said lens to abut against said seal forming a watertight, airtight, dustproof connection.

* * * * *